US008249236B2

(12) United States Patent
Das et al.

(10) Patent No.: US 8,249,236 B2
(45) Date of Patent: Aug. 21, 2012

(54) NETWORK CALL BACK TO ADD CONFERENCE PARTICIPANTS AND/OR MEDIA CAPABILITIES

(75) Inventors: Kamala Prasad Das, Manalapan, NJ (US); Ajay Sathyanath, Edison, NJ (US)

(73) Assignee: Alcatel Lucent, Paris (FR)

( * ) Notice: Subject to any disclaimer, the term of this patent is extended or adjusted under 35 U.S.C. 154(b) by 706 days.

(21) Appl. No.: 12/317,900

(22) Filed: Dec. 30, 2008

(65) Prior Publication Data

US 2010/0034367 A1 Feb. 11, 2010

Related U.S. Application Data

(60) Provisional application No. 61/188,364, filed on Aug. 8, 2008.

(51) Int. Cl.
H04M 3/42 (2006.01)
H04M 7/00 (2006.01)

(52) U.S. Cl. ......... 379/202.01; 379/210.01; 379/221.03; 379/221.04; 379/221.07

(58) Field of Classification Search ............. 379/202.01, 379/210.01, 201.01, 219, 221.03, 221.04, 379/221.07; 455/519, 416; 709/205, 204; 370/352
See application file for complete search history.

(56) References Cited

U.S. PATENT DOCUMENTS

| 6,748,443 | B1 | 6/2004 | Parry et al. ................ 709/232 |
| 6,956,857 | B2 | 10/2005 | Goldman .................. 370/395.2 |
| 7,228,145 | B2* | 6/2007 | Burritt et al. ................ 455/519 |
| 2003/0145054 | A1* | 7/2003 | Dyke ........................... 709/205 |
| 2006/0274730 | A1* | 12/2006 | Medlock et al. ............... 370/352 |
| 2008/0139166 | A1 | 6/2008 | Agarwal et al. ............. 455/404.1 |
| 2008/0144615 | A1 | 6/2008 | Casey ........................... 370/389 |
| 2008/0162637 | A1 | 7/2008 | Adamczyk et al. ........... 709/204 |
| 2008/0176582 | A1 | 7/2008 | Ghai et al. ................. 455/456.2 |
| 2008/0253390 | A1 | 10/2008 | Das et al. ....................... 370/465 |
| 2008/0298353 | A1 | 12/2008 | Zhu et al. ...................... 370/356 |
| 2009/0129388 | A1 | 5/2009 | Akhtar et al. ................ 370/392 |

FOREIGN PATENT DOCUMENTS

CN 1 832 447 A 9/2006

(Continued)

OTHER PUBLICATIONS

Tromparent M-M: "Communication Protocol for Interdomain Resource Reservation" Proceedings of the SPIE—The International Society for Optial Engineering, SPIE, Bellingham, VA; US, vol. 3126, Aug. 1, 2004, pp. 255-266.

(Continued)

Primary Examiner — Thjuan K Addy
(74) Attorney, Agent, or Firm — D. M. LaBruno (57) ABSTRACT

An exemplary method includes receiving at a calling party network a notice of an intended communication between a calling endpoint and a plurality of called endpoints located in a plurality of called party networks, wherein the intended communication requires a resource in each of the calling party network and the called party networks for supporting a streaming data protocol. The notice is forwarded toward the plurality of called party networks and in parallel with said forwarding, a determination of resource availability for the calling party network is initiated for the intended communication. The method further includes determining for the intended communication the determination of resource availability for the calling party network, wherein the determination is for a first resource for the first network; and verifying resource availability for the intended communication based on the determination for the calling party network and a resource availability indicator for each called party network.

20 Claims, 4 Drawing Sheets

FOREIGN PATENT DOCUMENTS

| | | |
|---|---|---|
| EP | 1 777 896 A1 | 4/2007 |
| WO | PCT/US2008/004548 | 11/2008 |
| WO | PCT/US2009/004249 | 12/2009 |

OTHER PUBLICATIONS

"Telecommunications and Internet Converged Services and Protocols for Advanced Networking (TISPAN); Resource and Admission Control; Protocol for QoS Reservation Information Exchange Between the Service Policy Decision Function (SPDF) and the Access-Resource and Admission Control Function (A-RACF) in"ETSI Standards, LIS, Sophia Antipolis Cedex, France, vol. TISPAN, No. V1.2.1, Feb. 1, 2007, pp. 1-30.

"Telecommunications and Internet Converged Services and Protocols for Advanced Networking (TISPAN); Resource and Admission Control Sub-system (RACS); Functional Architecture; Release 2; draft ETSI ES 282 0003" ETSI Standards, LIS Sophia Antipolis Cedex, France, vol. TISPAN, No. V0.2.2, Oct. 1, 2006, pp. 1-76.

Tompros et al: "Interworking of heterogeneous access networks and QoS provisioning via IP multimedia core networks", Computer Networks, Elsevier Science Publishers B.V., Amsterdam, NL, vol. 52, No. 1, Nov. 20, 2007, pp. 215-227.

Nokia: "IMS Short Session Setup", 3GPP DRTAFT; C1-051180-Sessionsetupdisc—Revised, $3^{rd}$ Generation Partnership Project (3GPP), Mobile Competence Centre; France, vol. CT WG1, Oct. 5, 2005, 6 pgs.

3GPP, Technical Specification Group Services and System Aspects: "IP Multimedia Subsystem (IMS)", Jun. 9, 2008, pp. 1-240.

\* cited by examiner

NETWORK CALL BACK TO ADD CONFERENCE PARTICIPANTS AND/OR MEDIA CAPABILITIES

RELATED APPLICATION

This application claims the benefit of U.S. Provisional Application, "Method And Apparatus For End-To-End Capacity And Priority Management Through Multiple Packet Network Segments", 61/188,364 filed Aug. 8, 2008 concurrently herewith. The entire teachings of the above application are incorporated herein by reference.

FIELD OF THE INVENTION

The invention relates to the field of communication systems, and, more specifically, to a resource control and policy-based management mechanisms adapted to implement services including priority services.

BACKGROUND INFORMATION

Often, a call may go through several service provider networks in order to connect from a calling party to a called party. Each service provider's network may include several domains (or administrative boundaries). In Time Division Multiplexed (TDM) Networks, resource clearance using signaling messages is supported through serial resource clearance on a link-by-link basis. In the serial (or sequential) case, no node transmits a message until first obtaining resource clearance within its domain. Accordingly, the total time required to set up a call or session with a link-by-link signaling method is $O(\Sigma t_i)$ where $t_i$ represents the time it takes for resource clearance in the i-th link.

Priority services is the name given to preferred treatment of certain kinds of traffic (e.g., media/data and signaling) over other kinds of traffic in, for example, the context of civilian or defense communication networks. Priority in a public switched telephone network (PSTN) is performed on a switch by switch basis. Calls for priority users, such as government entities pass through switches while non-priority traffic is blocked.

Three kinds of priority services exist as present; namely, wireless priority service (WPS), Government emergency telecommunications services (GETS) by national communications systems (NCS) and multi-level precedents preemption (MLPP) by the United States Department of Defense.

GETS provides an ability to preempt calls at a lower priority than MLPP. GETS also provides for buffer-type queuing of a call such that the call will be the first call to pass when a necessary resource becomes available. Call control functionality includes the decision of choosing which call to allow and which call to preempt. Resource control and policy-based management functionality includes the decision of when to preempt a call or when to buffer-type queue a call.

Within the context of voice, video and other data communications (e.g., multimedia communications and the like) via packet based networks (e.g., Ethernet, etc.) resource clearance is handled on a sequential basis. Methods for preemption and priority handling of voice calls and multimedia services are also lacking in packet based networks.

SUMMARY OF THE INFORMATION

A network element, apparatus and method for combining call admission control and priority services within different type of networks is provided. A logical functional entity denoted as a Priority Services Functional Element (PSFE) enables administration of priority services and call or session admission control policies through interactions with Call Session Control Function Element (CSCF) and Resource Access Control Facilities (RACF). Method steps in exemplary embodiments may include verifying the priority levels, receiving resource availability information, storing call admission and resource allocation information, identifying path and link information required for an originated session, checking available resources at links against required, requested and sufficient resources for the call or session establishment, and communicating resource availability and sufficiency indication/s (or lack thereof) based on admission control policies after resource verification.

The PSFE allows for capacity and priority management in parallel over all the links in the bearer path within a particular network. PSFEs in different networks can also communicate to enable PSFEs in each network in the path to perform resource clearance independently and in parallel (i.e., undertaking apparent or actual performance of more than one operation at a same time). Proposed methods allow both kinds of parallelization in networks of different architectures, such as IMS and SIP, and also across varied networks. The PSFE introduces obtaining parallel resource clearance across network boundaries, including heterogeneous networks. In this manner, calls or sessions may be established efficiently, and varied features provided in a multi-media network.

PSFE may use Session Initiation Protocol (SIP) messages to communicate with Signaling and Service Layer entities, such as Proxy (P-) or Interrogating (I-) CSCFs, Subscriber Information Databases (e.g., Home Subscriber Server or HSS), and Application Servers (AS). PSFE may also communicate with Transport Layer entities (such as, RACF in an all IMP Multimedia Subsystems (IMS) architecture) using, for example, Diameter messages. However, PSFE may integrate both IMS and non-IMS Next Generation Service Provider (NGSP) networks and enable efficient resource verification and allocation in the non-IMS NGSP also. Further, the PSFE may also determine resource availability using open loop control or other accounting methods in a network without a RACF.

Parallel resource clearance is useful in establishing various multi-media services in all IP-based networks regardless of the types of users and may be utilized in Enterprise, Commercial Service Provider, Civilian Government, and Military network segments of IP networks. In context of priority services, such a PSFE can provide higher priority to priority service users and queue such users' requests for resources ahead of resource requests from other, routine users. Priority session requests and associated priority levels can be identified by the PSFE, for example, through Resource Priority Headers (RPH) in the SIP message. It is important to note that to queue priority sessions ahead of routine sessions, no routine session can be allowed in any of the links in the priority session path. Coordination of such activities across multiple network segments, which is quite complex among CSCFs, Back to Back user Agents (B2BUAs), and Session Border Controllers (SBCs) in separate network segments, can be achieved via communicating PSFEs deployed in these segments.

Next generation networks may offer various services with multi-media capabilities. For example, multi-media point-to-point communication or multimedia conferencing may be offered. Typically, the media used in multi-media communications has different bandwidth and performance requirements. For instance, video services require high bandwidth while data communications require lesser bandwidth in general. Further, a user may be able to use multi-media communications services separately or in combination as per the user need. For example, a user may share a whiteboard or net-meeting with another user exchanging data only or may talk between themselves at the same time or may even use real-time video communications. Multiple users may also participate similarly.

In normal conditions, the communication network has sufficient bandwidth to support any such combination of media services. However, networks may not have sufficient bandwidth during stressed times, which could occur due to environmental causes (e.g., earthquake, or tornado) or due to unintended human actions (e.g., fiber cut due to digging) or intentional and malicious human activities (e.g., hacking, virus, terrorism). Furthermore, networks in the communication path may be bandwidth constrained such as, wireless networks, or ad-hoc network segments as sometimes used in emergency or in tactical war environments. In such situations, there may not be sufficient bandwidth to initiate the full multi-media service suite. Nevertheless, it may be desirable and prudent to establish the services that can immediately be started based on available bandwidth (with acceptable performance and as allowed by network policies) and add the other services as soon as more bandwidth becomes available. A call-state aware functional element knowledgeable about transport resource usage is provided to enable resource usage assessment and procurement that permits such incremental resource addition, including network initiated call back of call parties and call conferees.

Several different types of situations, e.g., user addition, media addition, and media quality and capability enhancement, can be addressed through such ad-hoc resource addition on availability. With user addition, users can be added subsequently when there is not sufficient bandwidth to add all desired participants at the start of a conference. For media addition, media types can be added incrementally when there is not sufficient bandwidth to support all media types requested in a call/session initially For media quality or capability enhancement, when there is not sufficient bandwidth to support higher quality and higher capability sessions of a particular media (e.g., video or voice) initially, the higher level media may be provided as resources become available subsequently. The resource availability may occur from time-to-time from various reasons, including but not limited to, termination of previously established calls or sessions; restoration of bandwidth through network management or operations processes; and roaming by a roaming user into a network that can provide higher bandwidth.

PSFE may establish a conference call or session with allowable number of conferees and allowable media to start and keep the resource request for any additional users and media needs on priority. Requested resources are reserved at each leg of the call, lest the resources at one leg that was previously available be taken before resources at a congested leg are freed. PSFE become aware of resource availability from the information received periodically. When the calling party PSFE determines that resources are available in all legs of the call or session, corresponding CSCF may be directed to issue re-invites or call-backs to add other conferees to the existing conference and add media types/capabilities. An exemplary resource is bandwidth.

Apparatus and method are provided for capacity and priority management of a communications network for use in a system having a plurality of networks. An exemplary method includes receiving at a calling party network a notice of an intended communication between a calling endpoint and a plurality of called endpoints, the plurality of called endpoints located in a plurality of called party networks, wherein the intended communication requires a resource in each of the calling party network and the called party networks for supporting a streaming data protocol. The notice of an intended communication is forwarded toward the plurality of called party networks. In parallel with said forwarding, a determination of resource availability for the calling party network is initiated for the intended communication. The determination of resource availability for the calling party network is determined for the intended communication, wherein the determination is for a first resource for the first network; and resource availability for the intended communication is verified based on the determination for the calling party network and a resource availability indicator for each of the called party networks.

In one embodiment, the method includes receiving a resource availability indicator for ones of the called party networks and assigning a resource availability indicator for ones of the called party networks. The resource availability indicator may be a held indicator indicative of availability of resource for the intended communication at the corresponding called party network and a queued indicator indicative of an insufficiency of resource for the intended communication at the corresponding called party network.

In one embodiment, determining for the intended communication the determination of resource availability for the calling network includes reserving for the intended communication the first resource for the calling party network in the event the first resource is available for the intended communication. In another embodiment, determining for the intended communication the determination of resource availability for the calling party network includes reserving for the intended communication the first resource for the calling party network in the event the first resource is available above a threshold level.

In one embodiment, the method includes forwarding a re-invite for the intended communication toward the plurality of called party networks in the event verifying resource availability for the intended communication indicates availability of resources from the calling party network to each of the called party networks. An exemplary is bandwidth and resource availability may indicate accessibility of a resource above a threshold.

One embodiment may include forwarding a re-invite for the intended communication toward the plurality of called party networks based on a constraint in the event verifying resource availability for the intended communication indicates availability of resources from the calling party network to a set of the called party networks, wherein the set of called party networks less than all of the called party networks. The constraint may be an endpoint priority status, a ranking of endpoint priority, endpoints that are required for initiation of the intended communication, endpoints that are optional for initiation of the intended communication, a minimum resource requirement for the intended communication, a minimum fractional bandwidth resource requirement for the intended communication and the like, or some combination thereof.

Another embodiment may include forwarding an instruction to connect the calling party endpoint to a media server in the event verifying resource availability for the intended communication indicates availability of resources from the calling party network to a set of the called party networks, wherein the set of called party networks less than all of the called party network. Embodiments may further include receiving a call continuation instruction from the calling party endpoint; and forwarding a re-invite for the intended communication toward the set of called party networks based on the call continuation instruction. Forwarding a re-invite for the intended communication toward the set of called party networks based on the call continuation instruction may be further based satisfaction of a constraint. One embodiment may also include disconnecting the calling party endpoint based on the call continuation instruction; and forwarding a re-invite for the intended communication toward the calling party network based on satisfaction of a constraint.

In one embodiment, the method includes receiving at a calling party network a notice of an intended communication between a calling endpoint and a plurality of called endpoints, the plurality of called endpoints located in a plurality of called party networks, wherein the intended communication requires a resource in each of the calling party network and the called party networks for supporting a streaming data protocol; verifying resource availability of at least one resource in the first network; and in parallel with said verifying resource availability in the first network, forwarding the notice of an intended communication to the plurality of called party networks prior determining a first indication of resource availability of the at least one resource in the first network. The exemplary method also includes receiving a corresponding indication of resource availability for each of the called party networks; and forwarding a re-invite for the intended communication based on the first indication of resource availability and the corresponding indication of resource availability for each of the called party networks.

One embodiment may include assigning a default value for the corresponding indication of resource availability for ones of the called party networks in the event the corresponding indication of resource availability is not received within a predetermined period of time. In one embodiment, the re-invite is forwarded toward each of the plurality of called party networks in the event the first indication and the corresponding indications signify a required availability of resource. In another embodiment, the re-invite is forwarded toward a first subset of the plurality of called party networks in the event of a constraint being satisfied and both the first indication and the corresponding indications for the first subset signifying a required availability of resource. Yet another embodiment may include forwarding an instruction for connecting the calling party endpoint to a media server in the event of a constraint not being satisfied, wherein forwarding a re-invite is additionally based on the constraint and a call continuation instruction received from the calling party endpoint.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The subject invention will be primarily described within the context of voice calls. However, since the subject invention is directed to the broader issues of multimedia services (including voice calls) references to calls and communications within this specification should be broadly construed to include voice, video, audio, email and other multimedia communications.

Specific structural and functional details disclosed herein are merely representative for purposes of describing example embodiments. Example embodiments may, however, be embodied in many alternate forms and should not be construed as limited to only the embodiments set forth herein.

The subject invention enables the establishment and management of VoIP traffic, including traffic of different priority levels, in a network (for example an Internet Protocol (IP) network) with parallel resource clearance and monitoring of criteria indicative of importance of a new voice call entering the network, network capability and instantaneous load. Accordingly, an exemplary telecommunications system is described as one potential environment in which a subject invention operates and exists.

Generally speaking, the invention assists in enabling the following system and network characteristics: (1) A profitable uniform architecture that addresses the requirements for both DoD and NCS; (2) A minimization in the overlap functionality in terms of development and maintenance of priority service features; (3) A minimization of the impact on existing architectures; (4) Addressing the requirements of IMS as well as non-IMS environments; (5) An ability to add on priority service at any time by a network provider; (6) An interoperability with network solutions of multiple vendors; (7) An ability to pass priority calls earlier than routine calls, when a congestion has been cleared and ability to maintain "current gets/wps voice functionality" which may require an ability to mimic priority signal queuing from a TDM environments; (8) An adaptation to IMS and non-IMS based Next Generation networks; (9) An ability to extend and support, at least architecturally, multimedia applications and mid-call features for priority services in the future; and (10) the providing of call admission control.

The present invention provides for a logical functional entity denoted as a priority services functional element (PSFE) that integrates with both IMS and non-IMS networks and environments. Within the context of network architectures adapted to utilize a PSFE, the PSFE is added to the architecture as an additional logical entity, such that the rest of the network architecture remains substantially unmodified. The PSFE interacts with the session initiation protocol (SIP) proxies, call session control functions (PCSCF), resource access control facilities (RACF), (NGSP) and other PSFE entities.

It will be understood that, although the terms first, second, etc. may be used herein to describe various elements, these elements should not be limited by these term since such terms are only used to distinguish one element from another. For example, a first element could be termed a second element, and, similarly, a second element could be termed a first element, without departing from the scope of example embodiments. As used herein, the term "and" is utilized in the conjunctive and disjunctive senses and includes any and all combinations of one or more of the associated listed items, and the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It is noted that the PSFE can also perform its intended function without the use of a RACF. In that instance, control of specific links is achieved via accounting based methods (whereas control of an entire network is performed with a RACF). In one embodiment, a standard or commercial network architecture is modified to use a PSFE by providers seeking NCS compliance, though mandatory use of PSFE is envisioned for DoD networks. Optionally, PSFE interaction with H323 systems is provided. The invention may be utilized within the context of SIP, H323, voice over IP (VoIP) or, more generally, X over IP network (XoIP), where X is a voice, video or multimedia communication.

The PSFE may provide priority signal message queuing (queuing tracked by links of a transport path) and preemption capabilities (i.e., it is able to identify the calls that need to be preempted to decongest certain links). Queuing in this context refers to the buffering-type queuing as is known in the prior art. Queuing in the inventive context is termed by the inventor as protocol level queuing and includes buffering-type queuing as well as call state queuing. Queuing a call or other service occurs when, for example, resource availability is verified for a link during parallel resource clearance. In this case the call is not dropped; rather, its state is stored by the PSFE until appropriate resources become available for the call in each network to be traversed by the call. Being held or stored means that the state information of the call is stored for subsequent use. The state of a call comprises the call source, the call destination, the resources needed to support the call, and so on.

Call admission control in a simple form is defined as determining which calls should be dropped and which calls should be allowed. Priority services in a simple form is defined as providing preferential treatment to some calls and not other calls. To effectively perform call admission control and priority services, the network needs to have knowledge of the calls in the system, their actual call paths (control plane and media plane paths) as well as the transport resources available in the network. One embodiment of the invention includes within one entity (the PSFE), priority and call information (e.g., number of calls in system, available transport resources and the like) needed to combine and control call admission and priority service functions. Thus, the PSFE helps to simplify network control plane architecture by combining multiple priority-related functions (e.g., call admission control and priority services) in a single functional entity.

The PSFE optionally communicates via Diameter to a RACF. The PSFE may also be call-state aware such that it can identify calls over links in a transport network (transport resource aware). In some embodiments, the PSFE continuously polls a RACF to identify availability of resource such that resource clearance of multiple call paths may be handled efficiently. In some embodiments the PSFE operates without a RACF (e.g., for open loop or accounting based controls).

In some embodiments, additional support for the PSFE is beneficial. Specifically, at times it may be appropriate for a RACF to pass link information of a media path (e.g., via a PDFE) to the PSFE. However, this will be needed only under certain cases. RACF link information is not needed when a call flows or when a priority call is cleared. For a priority call not cleared by the RACF, link information is needed for all subsequent RACF-cleared calls so that the availability of resources supporting the non-cleared priority calls can be determined.

Optionally, a P-CSCF (or a Proxy in non-IMS cases) will pass every SIP message it receives to the PSFE. Optionally, a new 5xxx message to convey network attempts (e.g., in the case of priority call queuing) is appropriate. Optionally, a protocol between the PSFE and NGSPs may be adapted to address fault tolerance issues such that fault tolerance functionality need not be distributed across a number of CSCFs.

Figure 1:
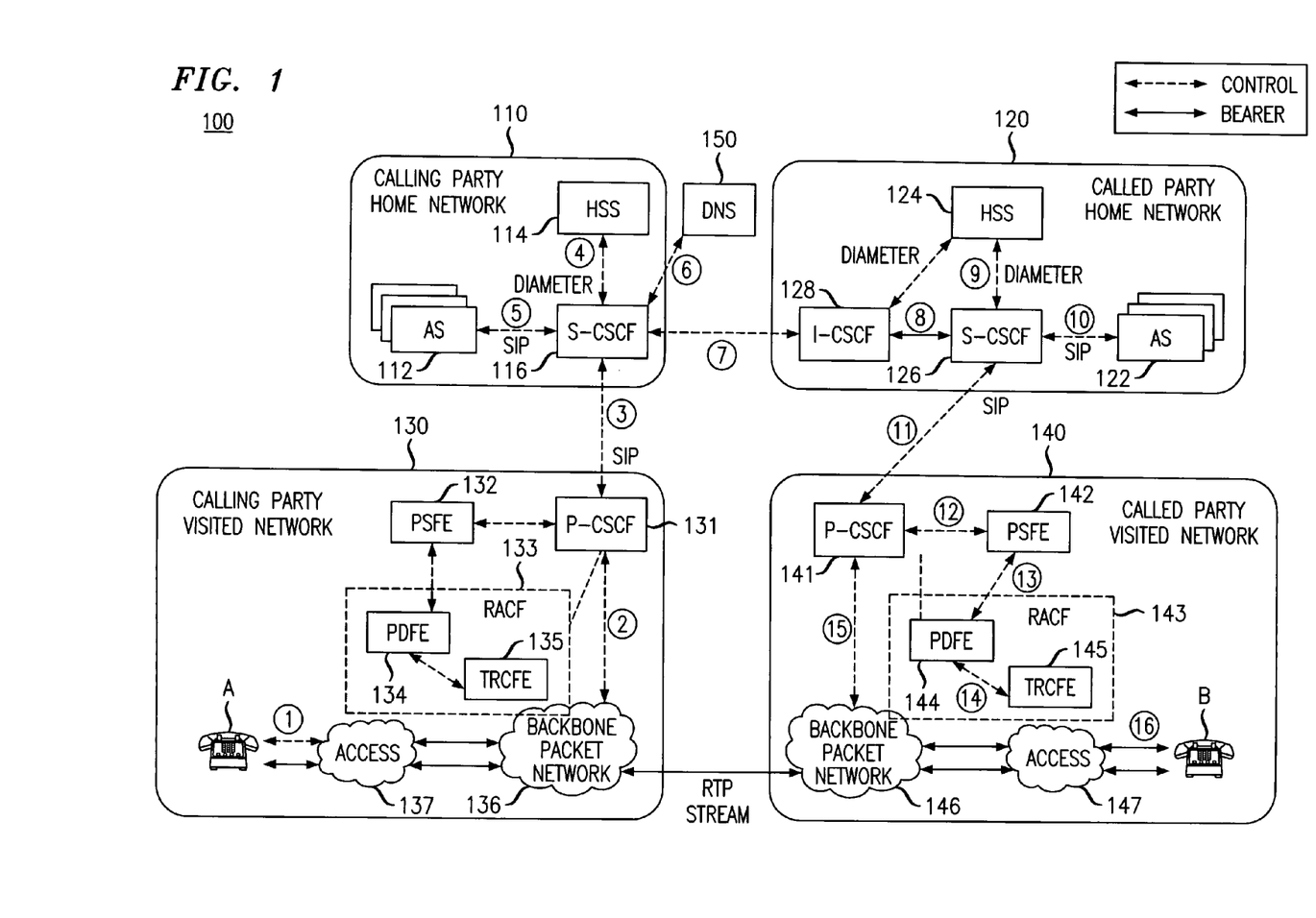
FIG. 1 depicts a network topology for facilitating calls through various networks according to an embodiment of the invention.

FIG. 1 depicts a network topology facilitating calls through various networks according to an embodiment of the invention. Specifically, FIG. 1 depicts an exemplary communications system 100 according to an embodiment of the invention. In addition to architecture, FIG. 1 also depicts control and bearer signal paths, which signal paths are associated with reference numerals indicative of a temporal order of utilization in establishing and tearing down calls. FIG. 1 will be discussed in conjunction with other FIGs. to illustrate various call flow examples according to embodiments of the present invention.

Specifically, FIG. 1 depicts a plurality of networks including a calling party home network 110, a called party home network 120, a calling party visited network 130 and a called party visited network 140.

The calling party home network 110 comprises one or more application servers (AS) modules 112, a home subscriber server (HSS) 114 and a serving call session control function (S-CSCF) 116.

The called party home network 120 comprises one or more application servers (AS) 212, a home subscriber server (HSS) 214, a serving call session control function (S-CSCF) 116 and interrogating call session control function (I-CSCF) 128.

The calling party visited network 130 comprises a P-CSCF 131, a priority services functional element (PSFE) 132, a resource allocation control function (RACF) 133, a backbone packet network 136 and an access network 137. The RACF 133 includes a policy decision functional element (PD-FE) 134 and a traffic resource control functional element (TRC-FE) 135.

The called party visited network 140 comprises a P-CSCF 141, a priority services functional element (PSFE) 142, a resource allocation control function (RACF) 143, a backbone packet network 146 and an access network 147. The RACF 143 includes a policy decision functional element (PD-FE) 144 and a traffic resource control functional element (TRC-FE) 145.

The network 100 FIG. 1 may be modified to represent a conventional network by removing each PSFE and RACF from the calling and called party visited networks. In this case, a call between A and B is initiated in accordance with the numbered signal paths 1-16; namely (1) a call invitation is communicated from Endpoint A via access network 137 to backbone packet networks 136, then (2) to P-CSCF 131 and then to (3) S-CSCF, which (4) queries HSS 114, (5) AS 112 and (6) DNS 150 to retrieve the appropriate information pertaining to the called party and its home network. S-CSCF 116 then (7) communicates with the I-CSCF 128 of the called party home network. I-CSCF 128 propagates the request (8) to S-CSCF 126, which communicates (9) with its local HSS 124 and (10) AS 122 together necessary information regarding Endpoint B. S-CSCF then (11) propagates a message to the P-CSCF 141 of the called party visited network 140 associated with Endpoint B.

The above steps (1-11) are fairly conventional. In a conventional network, the P-CSCF 141 communities with a backbone packet network 146 to identify those router and other output ports within the RTP stream capable of supporting the call. This information is propagated back to the P-CSCF 131. The P-CSCF 131 and P-CSCF 141 cause their respective backbone packet networks 136 and 137 provide a communication path supporting the call within the RTP stream.

The network 100 of FIG. 1 is depicted as including a PSFE and RACF within each of the calling and called party visited networks. The interaction of these components with each other and existing infrastructure will be described in more detail below with respect to the remaining figures.

Within the context of the present invention, a SIP Proxy (or P-CSCF) continues to work as a transaction-stateful or call-stateless proxy as regards all other features. All calls, independent of priority, to or from a SIP Proxy (or P-CSCF) are locally looped to a PSFE. The PSFE optionally maintains call-state information (including link identification information for the traversed links associated with the call) for all calls. Communications between PSFE and RACF are via diameter for necessary resource clearance, and various demands and requests necessary transport path information.

Advantageously, the PSFE enables parallel resource clearance across network boundaries, queuing a call in itself until resources become available. In order to set up calls in parallel across multiple links, the following call control functions are provided: i) call-state awareness about existing and in-progress calls/sessions; ii) ability to gather information regarding resource usages at the links and network elements, and iii) ability to correlate call path within its domain from the addresses. In one embodiment, the PSFE obtains all necessary resource clearance for a particular call in one parallel operation. The PSFE performs necessary signal message queuing when it decides that resources are available with its domain for a call as part of resource verification. The PSFE routinely polls the RACF to identify resource availability. The PSFE sends back appropriate (standard SIP) error messages to the SIP Proxy (or CSCF) to signal a call that is to be blocked, if need be (e.g., a higher priority call is queued). In the event of resource sufficiency for the PSFE's own network and receipt of an indication of resource sufficiency for another network to be traversed by an intended call, the PSFE sends back appropriate (e.g., standard) SIP protocol messages to the SIP Proxy (or CSCF) to signal a call that is to be allowed. The PSFE initiates 3rd party calling for queued calls via the P-CSCF, as and when the resources for those calls become available. In the case of a $3^{rd}$ party call, the network operates to communicate (i.e., call back) both the calling party and the called party at a later time.

While denoted as a realtime transport protocol (RTP) stream in FIG. 1, the backbone packet networks may communicate via any streaming protocol, such as transmission control protocol (TCP), user datagram protocol (UDP) and the like. Signaling messages are sent from the call control elements in the originating network up to the call control elements in the terminating network for setting up end-to-end voice, data and video sessions across multiple networks. Different mechanisms for carrying such messages can be put in place depending on the network topology, interconnectivity, and protocols supported by the underlying network.

Figure 2:
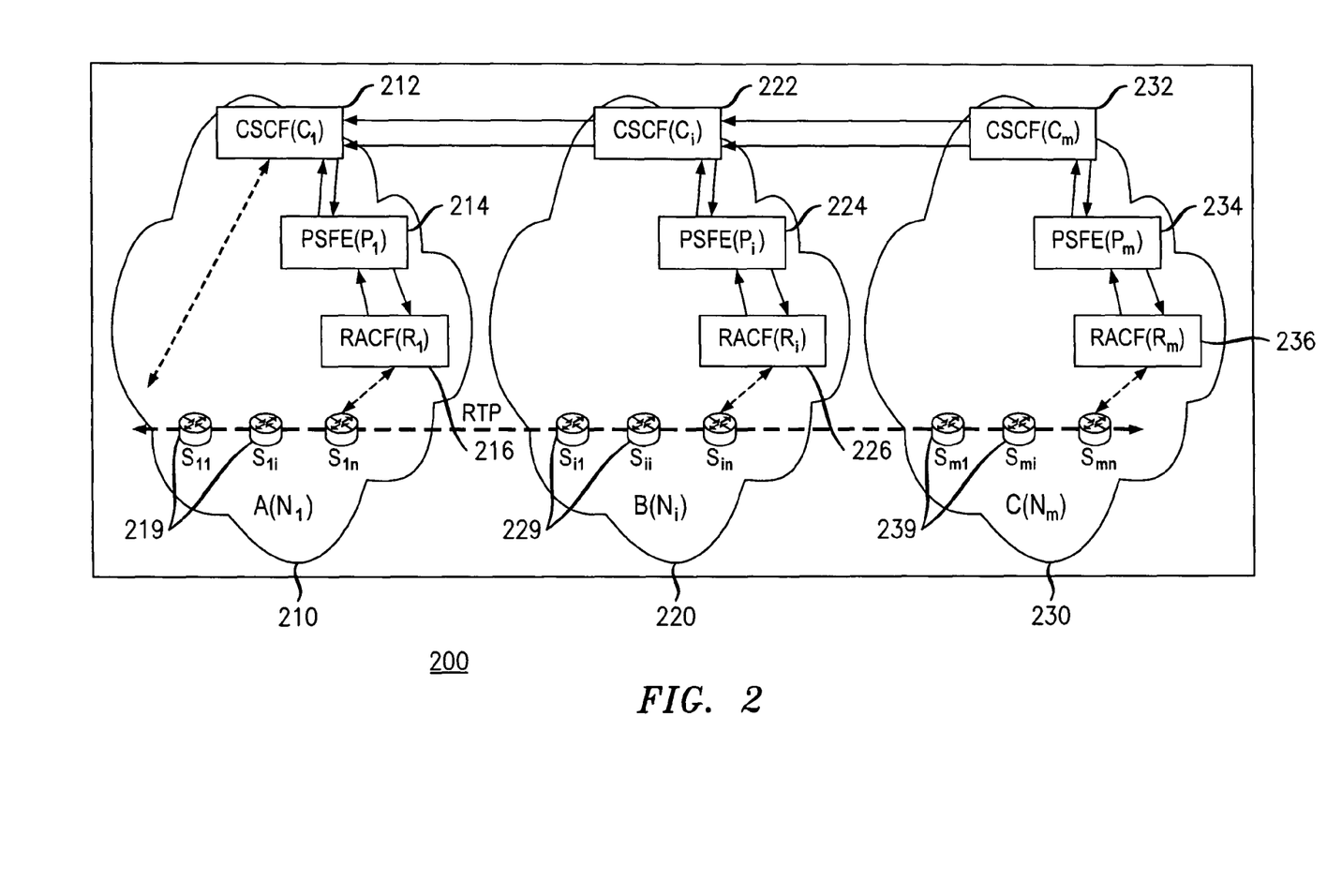
FIG. 2 depicts an overview of a network topology for facilitating calls through an exemplary network according to an embodiment of the invention.

FIG. 2 depicts an overview of a network topology for facilitating calls through an exemplary network according to an embodiment of the invention. A method according to the invention proposes to obtain resource clearance in parallel across all links within a network boundary, as well as obtain resource clearance across several network boundaries. A conventional system employs sequential resource clearance, in which no node transmits a message until that node first obtains resource clearance within its domain. (i.e., serial resource clearance is accomplished on a link-by-link basis). In contrast, in parallel resource clearance as provided by the PSFE, the apparent or actual performance of more than one resource clearance operation occurs at a time, by the same or different devices and modules. In the parallel case, the various time requirements for resource clearance (Ti) are triggered as and when a resource availability request is received in domain i, and the domain i does not wait for the completion of Ti before sending a resource availability request to domain i+1. In this manner, multiple domains may be obtaining resource clearance without having to wait for the completion of resource clearance in a previous one/s. When there are multiple links in each domain, resources clearance within a domain may also be performed in parallel. For example, by using PSFEs for obtaining resource clearance in parallel across all links within a network boundary, as well as obtaining resource clearance across several network boundaries, the time required for resource clearance will be reduced to $O(Max(t_i))$, where $Max(t_i)$ represents the maximum of all $t_i$, i.e., the maximum of all individual resource clearance times in individual links. Accordingly, the time required to process and transmit a message in a PSFE enabled network is much lower than the time required to wait for clearance on all links in a conventional network.

Such a methodology leads to one or more benefits. For example, setting up calls and sessions across an IP network will be more efficient and faster, which will reduce post-dial delay. Calls and sessions will have higher probability to complete set-up protocol exchanges before any particular timer expires, such as during set up when the networks are congested. For an end-to-end call which encounters multiple service provider (SP) networks, each SP network may be provided with information on resource needs and priority for the call/session, and the separate networks are able to assess and clear the calls. The time for set up of a call or a session that crosses several network domain boundaries (resulting from reasons, such as, administrative domains, geographical distribution, and population density, etc., even within a same SP network) will require only the maximum time required for setup in any of the domains.

Further, beneficial applications can be developed using the methodology provided. For example, the resource needs and priority assignment from the originating network/user may be communicated globally in a trusted manner with private mapping of such priority assignments at each separate network for specific internal usage within each network as described in U.S. patent application Ser. No. 12/317,882 entitled RHP Mapping And Defaulting Behavior, filed Dec. 30, 2008, which is herein incorporated by reference. In addition, the methodology provided facilitates the establishment of multiple call legs, where call legs for an intended communication may include legs for each end point (end point referring to users, media server, conferencing server, and the like) and for each media type (e.g., video, audio, text, data, and the like, and some combination thereof) and some combination thereof. For example, if capacity is constrained to support all media types in a multi-media call, reservations across media types in parallel can be utilized to enable early establishment of calls with one media requiring lesser capacity when required capacity to support all media types is unavailable at the start of a call between calling parties or the start of a conference call among multiple endpoints. Later, other media types can be added when capacities become available to support them. Similarly, resources may be scaled back in case of bandwidth constraint occurring after session establishment so long as connectivity is still established and services, even though reduced, are still offered. The necessity for resource reduction may occur for reasons reverse to those described with respect to resource addition, such as, traffic surge, network disruption from hardware and software cause/s, and roaming of a wireless network user into networks with limited capability. Additional detail relating to resource addition when additional capacities become available for a call is further described in U.S. patent application Ser. No. 12/317, 881 entitled Incremental Addition And Scale-Back of Resources Adapting to Network Resource Availability, filed Dec. 30, 2008 which is herein incorporated by reference.

An overview of the mechanism for the parallel resource clearance by PSFE across multiple networks is outlined in FIG. 2. Further detail may be found described in U.S. patent application Ser. No. 12/317,883 entitled End-To-End Capacity And Priority Management Through Multiple Packet Network Segments, filed Dec. 30, 2008 which is herein incorporated by reference. For example, in FIG. 2, a call may be initiated from a caller at network A to a called end at network C and will traverse network 200, which comprises networks A 210, B 220 and C 230. Alternatively stated, a call initiated from the caller to the called end will traverse networks $N_1$, $N_2$, $N_3$, $N_i$, ... $N_M$, where $N_1$ is the head end, and $N_M$ is the tail end of the call. The head end refers to network components like proxies, CSCF and PSFEs closest to the caller, while tail end refers to those network components closest to the called user. Also note that only three networks, namely A, B and C are illustrated for simplicity.

Each network includes a CSCF (212, 222, 232), a PSFE (212, 224, 234), a RACF (216, 226, 236), and a backbone packet network (218, 228, 238). The backbone packet network in each network may include a plurality of servers (219, 229, 239). The RACF may include a policy decision functional element (PD-FE) and a traffic resource control functional element (TRC-FE) (not shown)

All calls, independent of priority, to or from a CSCF are locally looped to a PSFE. The PSFE maintains call-state information (including link identification information for the traversed links associated with the call) for all calls. Communications between PSFE and RACF are via Diameter for necessary resource clearance, and various demands and requests necessary transport path information.

When a call from a calling party to a called party passes through networks A, B and C, then the PSFE element in each of those network clouds is responsible for obtaining necessary resource clearances in its own network respectively. In parallel with the verification of resource availability within its network, the PSFE forwards the notice of an intended communication to the next network and toward the called party network. As resources become available at at least a sufficient level in each of the networks, the PSFEs in that network wait for an indication of resource clearance to arrive from the tail end of the call. In other words, network B waits for the resource clearance indication from network C, and network A waits for the resource clearance indication from network B. Thus, network A will not receive a positive indication of resource clearance until both networks C and B have at least sufficient resources for the call. At this point the PSFE in network A, communicates to the CSCF in network A (or the SIP proxy in network A) and triggers a re-invite from the caller to the called user. In an alternative embodiment, PSFEs in each of the networks await for the resource clearance indication to arrive from the head end direction of the call.

In each of these network segments one or multiple PSFE communicates with the corresponding CSCF and RACFs. For example, if resource clearance is propagated toward the tail end, on receiving a new session or call request through SIP INVITE and from the identification that the call or session needs to be forwarded to the CSCF in Network B, the PSFE in Network segment A forwards a resource assessment request to PSFE in Network segment B, while looking into the resource requirement versus availability in Network segment A. The PSFE in Network segment A also follows up with a message to the CSCF and PSFE in network segment B regarding resource availability above the sufficiency threshold in Network segment A after its determination.

The PSFE in Network segment B performs the same function as the PSFE in Network segment A, which is sending a resource assessment request to PSFE in Network segment C by recognizing that the call or session needs to be sent to Network segment C while it gets engaged in verifying resource availability in Network segment B. PSFE in Network segment B also follows up with a message to the CSCF and PSFE in Network segment C regarding resource availability above the sufficiency threshold. The message to Network segment C may be based on resource availability above the sufficiency threshold in Network segment B after its determination and the resource availability/sufficiency determination message that Network segment B received from PSFE in Network segment A. The minimum level of resource available across both Network segment A and Network Segment B may be messaged to Network segment C The CSCF in Network segment C determines that the called end is in Network segment C. PSFE in Network segment C determines the resource availability for the requested call or session for the Network segment C and may, together with the availability message received from PSFE in Network segment B, determine the level of end-to-end resource availability before informing its decision on call or session admission to the CSCF in Network segment C. CSCF in Network segment C then admits or disallows the call based on PSFEs' decision (based on resource availability information that indicates resource sufficiency for PSFEs in A, B and C). The process repeats until the call is upgrade to the initially requested resource level.

In a further exemplary embodiment, the described process may be utilized for resource addition resulting in addition of conference participants. For example, a user-A in Network segment A may originate a request for conferencing with 3 other participants, user B in Network segment B, and users C and D in Network segment C. Assume for simplicity that Network segment A connects to Network segment B, and Network segment A connects to Network segment C without passing thorough Network segment B; that is, there are no intermediate networks. The session or call requires resources from network segments A, B, and C. Requests for resource availability assessment against resource needs are issued to PSFEs in each segment. As described above, PSFEs in terminating network segments B and C assess resource availability against needs in their respective network segments. Assume that PSFE in network segment C finds out that there are sufficient resources in segment C to start conferencing between users in segments A and C, but the PSFE in segment B finds insufficient resource. In that case, PSFE-C sends a "held" message indicating that at least a sufficient level of resource is available for the intended communication. The "held" message is forwarded to PSFE-A via the CSCFs. PSFE-B queues the resource request in segment B and also for any legs that will be necessary to connect user-B to the conference. PSFE-B also notifies PSFE-A of this status via a "queued" message which indicates less than a threshold level of requested resource is available for the intended communication at Network segment B. Endpoint A is then notified of the status that Endpoint B can not be connected, but that Endpoints C and D can be connected.

The user at Endpoint A may be given the option to start a conference among Endpoints A, C and D or wait until all conferees are available before initiating the conference. In various embodiments, user-A may indicate a preferred order of users to be added, such as by individual and by group identifications. If initiation of the conference with less than all conferees is chosen, then PSFE-A directs CSCF-A to begin the conference among Endpoints A, C and D. An indication that Endpoint B in network B will be added as resources become available may also be offered to conference participants. This indication may engender a playback of a verbal message at the endpoints available for conferencing. Messages are then passed between CSCF-A and CSCF-C to start the conference. If waiting until all conferees are available is chosen, Endpoint A may also be given the choice of either being held and connected to a media server or being disconnected and called by the network when all conferees become available. Thus, based on the user choice, Endpoint A is either connected to the media server or is temporarily disconnected. In the alternative, instead of being open to user selection, a predetermined one or set of the options can be pursued. As other calls or sessions end in segment B, and PSFE-B learns that sufficient resources exist in segment B and notifies PSFE-A with a "held" message via the CSCFs. PSFE-A then instructs CSCF-A to add the necessary endpoints to the conference through, for example, SIP conferencing messages.

These capabilities can be used in many different ways. For example, a conference may be initiated with available media type and capabilities, and additional media types and capabilities added as they become available. For instance, if capacity is constrained to support all media types in a multimedia conference call, reservations across media types in parallel can be utilized to enable early establishment of a conference with one media requiring lesser capacity (e.g., voice) when required capacity to support a higher bandwidth media type (e.g., video) is unavailable at the start of the conference. These capabilities may also be provided in context of priority services as PSFE can provide higher priority to priority service users and queue those users requests ahead of resource request from other routine users. The priority session requests along with associated priority levels can be identified by the PSFE for example, through the Resource Priority Headers (RPH) in the SIP message.

For example, a user-A may initiate a request for simultaneous voice, video, and data sessions with users B and C. As the request is forwarded from CSCF to PSFE for clearance, PSFE determines that there is only sufficient bandwidth for the voice session but not for video conferencing and whiteboarding. In that event, the PSFE indicates to CSCF to initiate the voice conference and queues the resource request for the other media types. As other sessions terminate, the PSFE grabs the resources cleared and indicates to CSCF to proceed with adding other white-boarding and video conferencing sessions. Similarly, the PSFE provided may be utilized for sessions of same media that may be started with lower quality and lower capabilities and subsequently the sessions are upgraded to improved quality and capabilities as resources become available.

Moreover, scale-back of resources can be achieved when network resources are incrementally diminished following a similar resource assessment, comparison, notification, and agreement. Such capabilities are desirable when calls/sessions with diminished capabilities are preferable than dropping the call/session altogether.

In other embodiments, a transit network may be interposed two of the Network Segments illustrated (e.g., between Network segments A and B, Network segments B and C). A transit network is used for bulk transport between networks providing user services. Such transit networks provide bulk transport services only and do not have call or session managers associated therewith but may honor Service Level Agreements (SLA), which are primarily based on statistically averaged call or session performance over time. SLAs are generally based on connectivity metrics such as, downtime, reliability and availability measures, and bytes sent/received, and Quality of Service metrics such as, delay, delay variation, packet loss and packet throughput.

Transit networks do not provide individual call or session control and management. Thus, the transit network and its partners will typically have an overall bulk transport carrying agreement but the transit network does not support specifically any individual call or session related characteristics. For example, a transit network may be outfitted with a PSFE, RACF and a Backbone network but not have a CSCF.

For calls passing through such core transport networks or transit networks, obviously call or session management is not performed by the core transport service provider. Thus, the originating and/or terminating network service provider on either side of the transit network is responsible to provide end-to-end call or session admission, and management. Accordingly, the PSFE also is enabled to negotiate and determine resource availability from the transport-only networks. In addition, as described above, the PSFE performs resource assessment in its own network and forwards a resource assessment and clearance request through SDP offers to PSFEs in the call path as determined from the destination URI. Based on received the availability information for its own network and other networks in the call path including any interposed transit networks, a PSFE decides on call admission and instructs the Call Session Control Function Elements (CSCF) for implementing call or session admission decisions.

Figure 3:
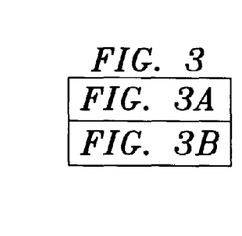
FIGS. 3a and 3b depict a flow diagram of an exemplary routine according to embodiments in accord with the invention.
Figure 3A:
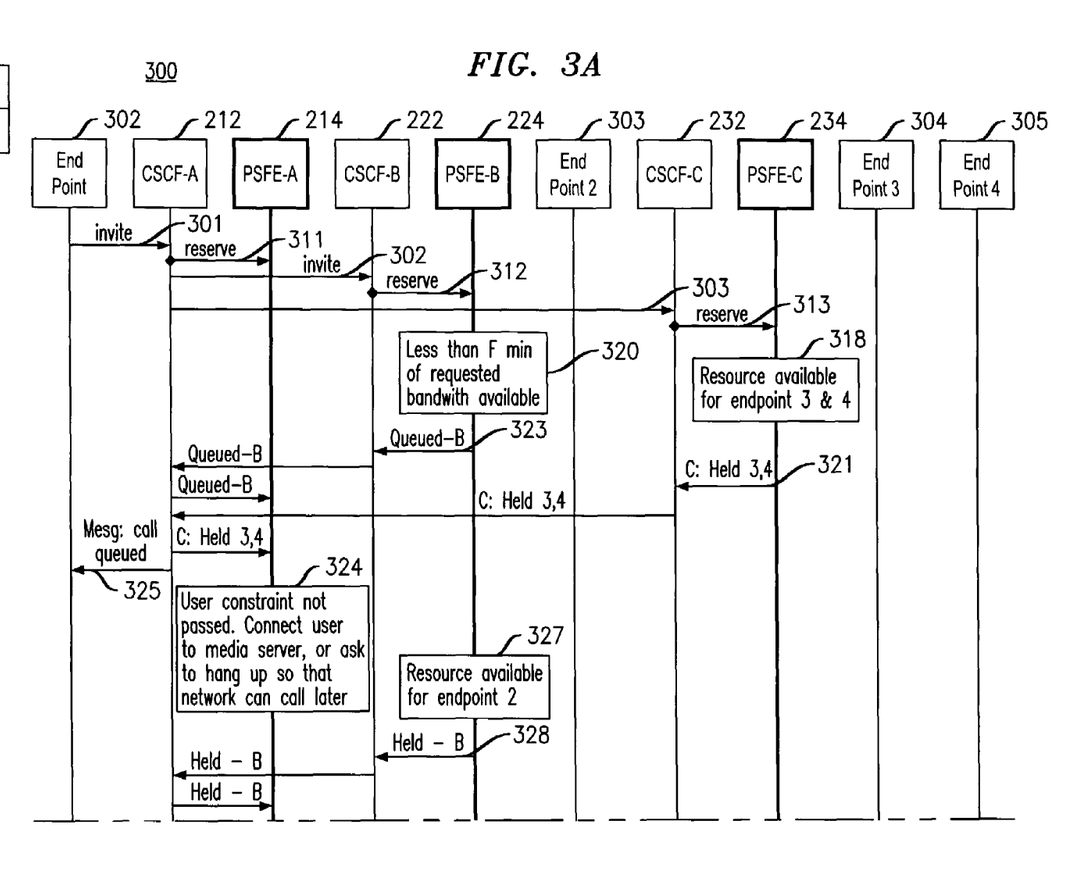
Figure 3B:
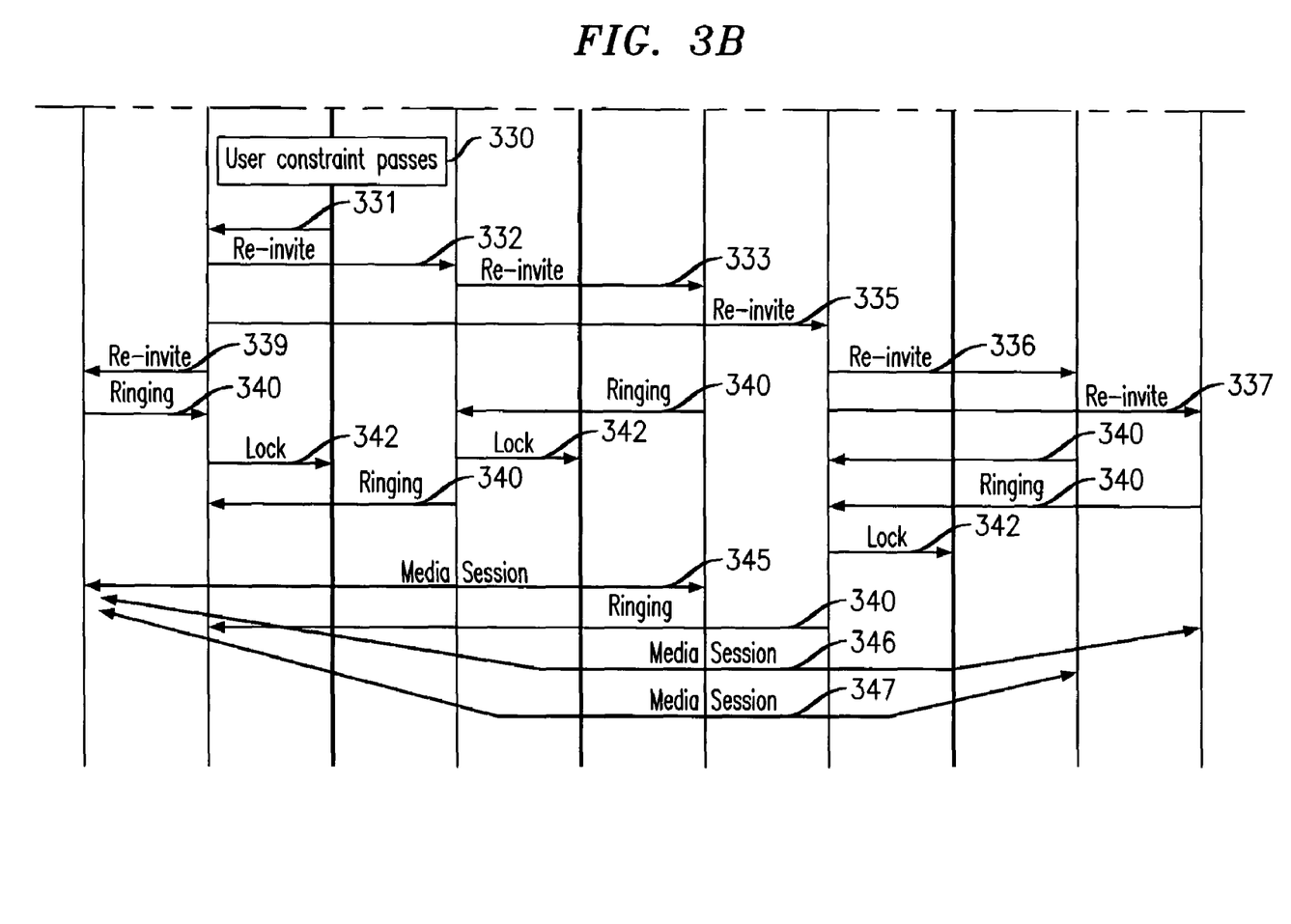

FIGS. 3a and 3b depict a flow diagram of an exemplary routine according to embodiments in accord with the present invention. The call blocking call flow, call queuing and call creation for the parallel resource clearance of 300 of FIGS. 3a and 3b will be described in accord with a communications system similar to that of FIG. 2. However, in the following description Network A communicates with Network B and Network C but Network B is not an intermediate between Networks A and C. Specifically, control signal paths between conference call Endpoint-A (also referred to as Endpoint 1) 302 in network A (i.e., calling party network) and called Endpoint-B (also referred to as Endpoint 2) 303 of network B (i.e., a first called party network), as can be gathered from FIG. 3a comprise, in the order named, CSCF-A 212, PSFE-A 214, CSCF-B 222, PSFE-B 224. Control signal paths between conference call Endpoint-A 302 and called Endpoint-C (also referred to as Endpoint 3) 304 and called Endpoint-D (also referred to as Endpoint 4) 305 of network C (i.e., a second called party network) comprise, in the order named, CSCF-A 212, PSFE-A 214, CSCF-C 232, PSFE-C 234. There may be multiple endpoints in a same network.

Referring now to FIG. 3a, at 301 an invite message is propagated from calling Endpoint A to CSCF-A 212, then at 302 to CSCF-B 222. Similarly at 303 the invite message is propagated from CSCF-A to CSCF-C 232. In general, the calling party network sends an invite message toward the called network for each conferee until the called network is reached by the notice of intended communication. Invites are forwarded based on conferee addresses and may pass thorough intermediate networks to reach the called party network.

The calling endpoint (Endpointi) also establishes conference constraints, such as conference or user priority status, users who must be present to start the conference and users who are optional, the minimum resource requirement (e.g., minimum fractional bandwidth required $F_{MIN}$) from media perspective to participate in the conference, etc. The PSFE at the head end gathers constraints from Endpoint 1. For example, PSFE-A may gather constraints via DTMF collection or via extended SIP headers.

In parallel with the receipt of the invite message, each CSFS (213, 222, 232) requests corresponding PSFE (214, 224, 234 respectively) to verify resource availability for a resource required for the intended communication (e.g. local estimate of resource availability at 318, 320 and 322). For example, when an invite message enters a first network (e.g., network C), the corresponding PSFE (e.g., PSFE-C 234) attempts to reserve necessary resource for the call and queues the call in its stack. The corresponding PSFE (e.g., PSFE-C 234) may determine from corresponding RACF (e.g., RACF-C 236 not shown in FIG. 3a) if resources are available for all the links within the first network (e.g., network C) for this particular call. In one embodiment, if requested resources are not available, the call is queued, and no lower or equal priority call is allowed until this particular call gets a chance to obtain the requested resource capacity.

For example, in the case of dynamic real-time bandwidth management, to determine if corresponding resources are available, corresponding RACF (e.g., RACF-C 236) listens to the SNMP messages from multiple switch/routers in that network (e.g., network C) in parallel and determines if all the necessary link/s that constitute the call have enough resource/s available or at least a minimum percentage of the requested resource is available. The minimum fractional part or sufficiency threshold of the total resource requested ($F_{min}$) may be previously provisioned per service type or may be specifically prescribed by the invite message. If resource $Res_i$ is available in network i, and $Res_i$ is a fraction of the requested resource Res, i.e., $Res_i = Fi*Res$ is available (such that, $F_{min} < Fi <= 1$), then corresponding PSFE holds this resource and waits for confirmation from downstream PSFEs. For instance, the requested resource may be bandwidth. In that case, if bandwidth Bi is available in network i, and Bi is a fraction of the requested bandwidth B (i.e., $Bi=Fi*B$ is available) such that, $F_{min} < Fi <= 1$, then corresponding PSFEi holds this bandwidth and waits for confirmation from downstream PSFEs. PSFE may determine by itself (in case of open loop mode) or with information gathered form a corresponding RACF (in case of closed loop mode) if all necessary links that comprise the intended communication through the corresponding network have resource availability or at least a minimum fractional amount of the requested resource.

For example, in FIG. 3 at 318, PCFE-C determines that a resource requested for Endpoints 3 and 4 is available at the least above a threshold amount. The availability of resource in a network is determined as the available resource greater than a minimum required for the call ($B_m >= F_{min}*B$ where $F_{min}*B$ or $B_{min}$ is referred to as the absolute minimum bandwidth/resource that is required by the network to accept a call). This absolute minimum may be different for different media types, codecs, QoS, etc.

If the PSFE is in the called party network (e.g., network C), the response may be forwarded based on resource availability within the called network alone. Since Network C is a tail end network for a conferee, PSFE-C forwards a response 321 to PSFE of the previous one of the networks directed toward the head end network, when resources are available at least a sufficient level. If no resource is available above the threshold, the call may be queued as per network policy, and a notification through a resource "queued" message directed the corresponding CSCF for delivery toward the head end. Alternatively, PSFE may wait until resource are available above the threshold before indicating that status toward the head end. If a fraction ($F_i$) of the requested amount is available, then the resource is held and the status is notified through resource "held" message. The resource "held" message can be implemented as a 1xx message.

Thus, as illustrated in FIG. 3b, at 318 resource availability for Endpoints 3 and 4 is verified in network C and this status is notified through resource "held" message 321 back to the PSFE-A via the corresponding CSCFs. Similarly, at 320 it is determined that less than a minimum resource necessary for the intended communication in Network C is available. The intended communication is queued as per network policy and the head end PSFE-A notified through a resource "queued" message 323 via corresponding CSCFs.

In cases where dynamic bandwidth management is not required and mere call counting or bandwidth counting will suffice, the corresponding PSFE or the corresponding RACH may be directly involved in bandwidth or call counting and determine the availability of the necessary resource/s. The act of queuing the call and communication with the corresponding RACH ensures that resources are obtained in parallel in that network (e.g., network C). In case of dynamic bandwidth management, all corresponding routers in the network may send updates in parallel to the corresponding RACH of that network. The corresponding PSFE then makes decisions based on the query to the corresponding RACH of the network as described above.

In one embodiment, for PSFE deployed in other than a tail end network, the intermediate network PSFE waits for the response availability message which indicates a resource sufficiency from the next PSFE toward the tail end, which arrives via corresponding CSCFs. The PSFE forwards a resource "held" message after it has received the resource availability response indicative of resource sufficiency from the PSFE corresponding to the next network towards the called party (i.e., $PSFE_{i+1}$) and determined that the available resource in its own network is greater than some threshold as described above. Thus, for intermediate network PSFE in a first network other than called party network (i.e., intermediate networks (e.g., network B) and the calling party network (e.g., network A)), a "resource held" message is forwarded if each network from the intermediate network in question to the called party network have resource availability for the intended communication. Again, the "held" message is delivered toward the head end CSCF via the corresponding CSCF of the appropriate corresponding networks.

According, at 320 PSFE-B determines that less than the minimum required resource is available in network B. This determination is performed in response to the reserve message 312 and thus in parallel with resource determinations at other called conferees' networks (i.e., networks for other endpoints; e.g., network C). Then for instance, after this determination, PSFE-B forwards a "queued" message indicative of the non availability of resource in network B. The "queued" message is received at head end PSFE-A.

In the event head end PSFE-A receives status messages from all PSFEi (i>1), PSFE-A determines if the constraint set by the calling endpoint $E_1$ is satisfied. In an alternative embodiment, PSFE-A may wait a predetermined time period before assigning a default insufficient resource status to a PSFEi (i.e., defaulting to a "queued" message received). If the constraint is satisfied, the conference call may be established with the available endpoints, at a minimum those endpoints that are able to satisfy the constraint. If the constraint is not satisfied, the calling endpoint may be advised of the current status of the conference and may be given the options for selecting how to proceed with the conference. For instance, the calling endpoint may be given the option of hanging up and being called back when all conferees are available or being connected to a media server for further exchange of further status and instruction information.

For example, when head end PSFE-A receives the resources "held" and "queued" messages from all PSFEi (i>1), PSFE-A verifies the constraint set by the calling endpoint $E_1$. As illustrated, PSFE-C responded that with a resource "held" message (321) but a resource "queued" message (323) was received from PSFE-A. Thus, $CSCF_1$ is directed to connect $Endpoint_1$ to a media server. The media sever may provide options for initiation of a conference involving the desired conferees. For example, the calling endpoint may be permitted start a conference with endpoint/users in networks that responded with resource "held" above a threshold (e.g., $F_i > F_{MIN}$) or to wait until all PSFEs send a resource "held" message. If the choice is to start the conference, PSFE-A sends a SIP Re-INVITEs (or SDP Re-offer messages) to those PSFEi's from which a resource "held" message was received as explained further below.

At 324, if PSFE-A receives all resources "queued" messages or decides that the constraint set by $Endpoint_1$ is not satisfied, Re-INVITE messages to start a conference are not forwarded. Instead, PSFE-A may connect $Endpoint_1$ to a media server for the purpose of requesting further instruction from the user at $Endpoint_1$. For example, PSFE-A may connects $Endpoint_1$ to a media server and play a message, informing the user that he/she may continue to hold or hang up with network call back when the constraints are met. If the user hangs up, PSFE-A notes the action.

At later times, whenever PSFE-A receives a resource "held" message from a PSFEi, and verifies that the held resource indicated by the message (e.g., $F_i$) allows satisfaction of the constraint set by the user $Endpoint_1$, then $PSFE_1$ may call back $Endpoint_1$ (if the user hung up) and connect the $Endpoint_1$ to the correct conference media server.

If $Endpoint_1$ was already in conference, the Endpoint is notified of the capability to add other users or other media capabilities through the media server. These capabilities are then added to the conference through re-INVITEs per $Endpoint_1$'s instruction, and via conferencing messages.

For example, at 327 PSFE-B determines that resource is available for Endpoint 2. The determined available resource may be the absolute minimum resource that is required by the network to accept a call. In this manner, a PSFE sends a resource "held" message toward the head-end PSFE only when resource is available for the intended conference at at least a threshold level. At 328, PSFE-B forwards a resource "held" message indicative of the available resource that has been determined, with the available resource at least above a threshold. A resource "held" message is essentially a command that instructs the CSCF that resources are held for a user, but are not yet consumed. The Held message may be implemented as a 1xx message.

In another embodiment, a transport network may be interposed for example networks A and B, PSFE-A of the head end network learning about the network where the call/session needs to be forwarded to (i.e., network B) and the intermediate transport network (A') from the called URI. The PSFE then verifies the SLA agreed with the transport network (A') and determines if the SLA assures at least minimal requirements for the call/session in progress. The originating network's PSFE utilizes this information to determine if the transport network has resource availability or at least a minimum percentage of the request resource is available for the transit network. Thus, in such an embodiment, PSFE-A also has verified that the transport network A' can assure the resources required in A' through communication with the transport network.

When head end PSFE (e.g., PSFE-A) receives the "held" response back from a previously "queued" PSFE, the head end PSFE verifies that the held resource indicated in the message (e.g., resource available, $F_i$, etc.) allows satisfaction of the constraint set by the user $Endpoint_1$. In FIG. 3b, at 330 PSFE-A determines that the user constraint is satisfied. The desired conference is then establish per Re-Invites to the endpoints and SIP conferencing messages such as ringing and lock. Once a call is establish, new users and capabilities may be added to the conference through re-INVITEs to the newly available endpoint and the endpoints respectively.

For example, referring to FIG. 3b, after the user constraint is satisfied, at 331 PSFE-A forwards a Re-Invite (e.g., a SIP Re-Invite, SDP Reoffer, or the like) message to CSCF-A which is propagated to the endpoints (Endpoint1 via 339; Endpoint2 via 332 and 333; Endpoint 3 via 335 and 336; and endpoint 4 via 335 and 337).

On receiving the Re-Invite, the called endpoint processes the call/session per its condition. If the call/session is accepted, then a "ringing" message is sent upstream from the endpoint to the corresponding CSCF for delivery to the calling party CSCF.

Each $CSCF_i$ also sends a "lock" message (328, 329, 330) to its $PSFE_i$ on receiving the "ringing" message so that resource reserved in the network is now dedicated for the conference call. In one embodiment, the resource reserved is the minimum of bandwidth available across each network ($B_{avl}$), which is the minimum of bandwidth available in each network. ($B_{avl}$=MIN ($B_1, \ldots B_M$), and which is also at least the absolute minimum resource required to accept the call ($B_{avl} >= B_{min}$). The "lock" message ensures the resource necessary for the call is locked in using the queued information associated with the call via lock message. A Lock message is essentially a command that instructs the PSFE that resources are now being used. The Lock message may be implemented as another 1xx message or could be piggybacked with 'ringing' message. Prior to the PSFE receipt of the Lock message, the call is merely queued and the resources are not being consumed. Messages need not be in SIP, but can be implemented in DIAMETER or any other protocol.

The PSFE of the present invention advantageously isolated Parallel Call Admission and Priority Services development so that such services are easier to develop and maintain. Moreover, such services may now be provided without service and software replication with respect to vendor product offerings. Parallel Call Admission and Priority Services can be an optional service required by a customer and can fit IMS and non-IMS networks, including H323. With the novel PSFE, newer DISA and NGPS features are easier to develop. In this manner, new features like "priority conference call reservation" of priority conferences may be implemented. In addition, the PSFE relieves the burden of having a CSCF or any other fully operational SIP Proxy maintain resource awareness (i.e., call states with respect to links). The PSFE provides resource control and policy-based management mechanism adapted to implement priority services in a packet network environment, such as described herein.

The above-described embodiments of the invention may be implemented within the context of methods, computer readable media and computer program processes. Generally speaking, methods according to the invention may be implemented using computing devices having a processor as well as memory for storing various control programs, other programs and data. The memory may also store an operating system supporting the programs. The processor cooperates with conventional support circuitry such as power supplies, clock circuits, cache memory and the like as well as circuits that assist in executing the software routines stored in the memory. As such, it is contemplated that some of the steps discussed herein as software processes may be implemented within hardware, for example as circuitry that cooperates with the processor to perform various steps. Input/output (I/O) circuitry forms an interface between the various functional elements communicating with the device.

A computing device is contemplated as, illustratively, a general purpose computer that is programmed to perform various control functions in accordance with the present invention. The invention also can be implemented in hardware as, for example, an application specific integrated circuit (ASIC) or field programmable gate array (FPGA). As such, the process steps described herein are intended to be broadly interpreted as being equivalently performed by software, hardware and a combination thereof in various alternative embodiments.

The invention may also be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a signal bearing medium such as a broadcast medium, and/or stored within a working memory within a computing device operating according to the instructions.

While not specifically noted, it will be appreciated by those skilled in the art that various network management system (NMS) and element management system (EMS) are used to manage the various functional elements discussed herein, including the new PSFE. Each PSFE is managed by an appropriate NMS and/or EMS, which is selected according to the network within which the PSFE operates. Thus, the PSFE is operable to provide bridge and information and protocol bridge between various management systems such that call state aware and priority state aware information may be utilized throughout a large group of networks, as discussed above.

Within the context of a NMS or EMS utilizing the present invention, an instantiation of an application such as an IMS application includes a PSFE that is logically and/or physically disposed between the RACF and CSCF of a network to perform the various functions discussed above. As such, one embodiment of the invention comprises a method for adapting a control plane of a communication network normally using a call session control function (CSCF) in communication with a resource access control function (RACF), where the method includes providing a priority service functional element (PSFE) between each RACF and its corresponding CSCF to verify a priority level for each call, receive resource allocation information from the RACF, store a resource allocation for each call, and cause the CSCF to preferentially allocate resources to high priority calls as discussed above with respect to the various figures. Instantiations supporting the PSFE may be provided on a single server or multiple servers, and/or within a single network or multiple networks.

An apparatus according to the invention is adapted for use in a system comprising a plurality of networks, each of which include a resource access control function (RACF), a call session control function (CSCF) and a packet network supporting, illustratively, a Realtime Transport Protocol (RTP) stream between the calling and the called party networks. The PSFE advantageously provides a knowledge of call-states as well as the "links" that they pass through, in order to block routine calls (e.g, NCS and DoD applications), queue priority calls against the "links" that they will use (e.g., NCS applications) and tear down/preempt calls, under certain conditions, based on the "links" that they traverse (e.g., DoD applications). The PSFE also provides an ability to perform $3^{rd}$ party calling (network initiated) when queued calls are processed, and an ability to obtain "link" (i.e., transport resource paths) information from certain elements in the network. This information is then passed to the relevant management system.

Reference herein to "one embodiment", "another embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. Although various embodiments which incorporate the teachings of the present invention have been shown and described in detail herein, those skilled in the art can readily devise many other varied embodiments that still incorporate these teachings.

What is claimed is:

1. A method comprising:
receiving at a calling party network a notice of an intended communication between a calling endpoint and a plurality of called endpoints, the plurality of called endpoints located in a plurality of called party networks, wherein the intended communication requires a resource in each of the calling party network and the called party networks for supporting a streaming data protocol;
forwarding the notice of an intended communication toward the plurality of called party networks;
in parallel with said forwarding, initiating for the intended communication a determination of resource availability for the calling party network;
determining for the intended communication the determination of resource availability for the calling party network, wherein the determination is for a first resource for the first network; and
verifying resource availability for the intended communication based on the determination for the calling party network and a resource availability indicator for each of the called party networks.

2. The method of claim 1 further comprising
receiving a resource availability indicator for ones of the called party networks.

3. The method of claim 1 further comprising:
assigning a resource availability indicator for ones of the called party networks.

4. The method of claim 1 wherein the resource availability indicator is one of a held indicator indicative of availability of resource for the intended communication at the corresponding called party network and a queued indicator indicative of an insufficiency of resource for the intended communication at the corresponding called party network.

5. The method of claim 1 wherein determining for the intended communication the determination of resource availability for the calling network comprises:
reserving for the intended communication the first resource for the calling party network in the event the first resource is available for the intended communication.

6. The method of claim 1 wherein determining for the intended communication the determination of resource availability for the calling party network comprises:

reserving for the intended communication the first resource for the calling party network in the event the first resource is available above a threshold level.

7. The method of claim 1 further comprising:
forwarding a re-invite for the intended communication toward the plurality of called party networks in the event verifying resource availability for the intended communication indicates availability of resources from the calling party network to each of the called party networks.

8. The method of claim 1 wherein the resource is bandwidth.

9. The method of claim 1 wherein resource availability is accessibility of a resource above a threshold.

10. The method of claim 1 further comprising:
in the event verifying resource availability for the intended communication indicates availability of resources from the calling party network to a set of the called party networks, wherein the set of called party networks less than all of the called party networks, forwarding a re-invite for the intended communication toward the plurality of called party networks based on a constraint.

11. The method of claim 1 wherein the constraint is an endpoint priority status, a ranking of endpoint priority, endpoints that are required for initiation of the intended communication, endpoints that are optional for initiation of the intended communication, a minimum resource requirement for the intended communication, a minimum fractional bandwidth resource requirement for the intended communication.

12. The method of claim 1 further comprising:
in the event verifying resource availability for the intended communication indicates availability of resources from the calling party network to a set of the called party networks, wherein the set of called party networks less than all of the called party networks, forwarding an instruction to connect the calling party endpoint to a media server.

13. The method of claim 12 further comprising:
receiving a call continuation instruction from the calling party endpoint; and
forwarding a re-invite for the intended communication toward the set of called party networks based on the call continuation instruction.

14. The method of claim 13 wherein forwarding a re-invite for the intended communication toward the set of called party networks based on the call continuation instruction is further based satisfaction of a constraint.

15. The method of claim 12 further comprising:
disconnecting the calling party endpoint based on the call continuation instruction; and
forwarding a re-invite for the intended communication toward the calling party network based on satisfaction of a constraint.

16. A method comprising:
receiving at a calling party network a notice of an intended communication between a calling endpoint and a plurality of called endpoints, the plurality of called endpoints located in a plurality of called party networks, wherein the intended communication requires a resource in each of the calling party network and the called party networks for supporting a streaming data protocol;
verifying resource availability of at least one resource in the first network; and
in parallel with said verifying resource availability in the first network, forwarding the notice of an intended communication to the plurality of called party networks prior determining a first indication of resource availability of the at least one resource in the first network;
receiving a corresponding indication of resource availability for each of the called party networks; and
forwarding a re-invite for the intended communication based on the first indication of resource availability and the corresponding indication of resource availability for each of the called party networks.

17. The method of claim 16 wherein receiving a corresponding indication includes:
assigning a default value for the corresponding indication of resource availability for ones of the called party networks in the event the corresponding indication of resource availability is not received within a predetermined period of time.

18. The method of claim 16 wherein the re-invite is forwarded toward each of the plurality of called party networks in the event the first indication and the corresponding indications signify a required availability of resource.

19. The method of claim 16 wherein the re-invite is forwarded toward a first subset of the plurality of called party networks in the event of a constraint being satisfied and both the first indication and the corresponding indications for the first subset signifying a required availability of resource.

20. The method of claim 16 further comprising:
forwarding an instruction for connecting the calling party endpoint to a media server in the event of a constraint not being satisfied, wherein forwarding a re-invite is additionally based on the constraint and a call continuation instruction received from the calling party endpoint.

* * * * *